No. 886,787. PATENTED MAY 5, 1908.
R. H. FISHER.
NUT LOCK.
APPLICATION FILED DEC. 11, 1906.
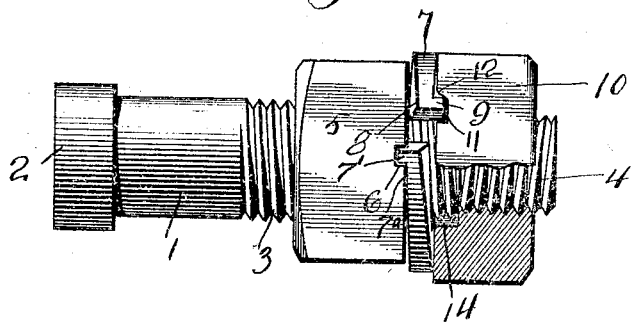
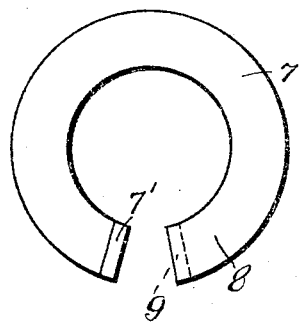
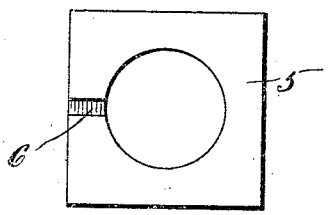
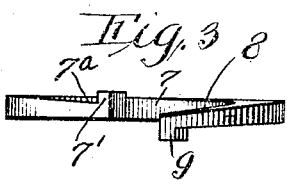
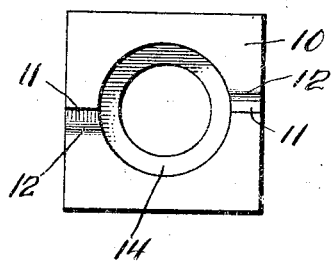
WITNESSES
INVENTOR
Ralph H. Fisher,
BY
Attorneys

UNITED STATES PATENT OFFICE.

RALPH H. FISHER, OF PITTSBURG, PENNSYLVANIA.

NUT-LOCK.

No. 886,787.   Specification of Letters Patent.   Patented May 5, 1908.

Application filed December 11, 1906. Serial No. 347,285.

*To all whom it may concern:*

Be it known that I, RALPH H. FISHER, a citizen of the United States of America, residing at Pittsburg, in the county of Allegheny and State of Pennsylvania, have invented certain new and useful Improvements in Nut-Locks, of which the following is a specification, reference being had therein to the accompanying drawing.

This invention relates to certain new and useful improvements in nut locks, and the invention has for its object the provision of novel means for positively holding a nut upon the end of a bolt.

Another object of this invention is to provide a simple and inexpensive nut lock which will be strong and durable and requiring no skill whatever to manipulate.

Briefly described, my improved nut lock consists of providing the threaded end of a bolt with a contracted end having threads the reverse of the threads upon the end of the bolt. The ordinary nut which is used in connection with the bolt has its outer face notched or grooved and in connection with this nut, I use a split washer having its ends bent to form lugs. One of said lugs is adapted to fit in the notch or groove above referred to, while the other of said lugs is adapted to fit in a notched or grooved nut mounted upon the contracted end of the bolt.

The detail construction of my improved nut lock will be presently described and then specifically pointed out in the appended claim.

Referring to the drawing forming part of this specification, like numerals of reference designate corresponding parts throughout the several views, in which:—

Figure 1 is a side elevation of my improved nut lock, partly broken away; Fig. 2 is a front elevation of a washer used in connection with the nut lock; Fig. 3 is an edge view of the same; Figs. 4 and 5 are elevations of nuts constituting my improved nut lock.

In the drawings, 1 designates a bolt, 2 the head thereof, the shank of the bolt being provided with a threaded portion 3, and a reduced outer end having threads 4, the threads 4 being the reverse of the threads 3, that is, the threads 3 being right handed and the threads 4 left handed or vice versa. In the present showing, the threads 3 are shown right-handed, and the threads 4 left-handed, and on the threads 3 is mounted a main nut 5 having a notch or groove 6 in its outer face.

On the threads 4 is mounted a follower-nut 10 provided on its inner face with diametrically opposed notches or grooves 11, one wall of which is beveled as at 12, see Fig. 5, the opposing wall being abrupt and extending in a direction corresponding to the axis of the nut, and this nut is also provided on its inner face with an annular recess 14 to receive the annular shoulder formed on the bolt by reducing the outer end of said bolt.

In connection with the two nuts above described, I employ a split washer 7, the ends of which are separated some distance from each other, and which washer is in the nature of a flat faced ring having at one end a lug 7' projecting at right angles to the faces of the washer, and at the other end a lug 9 also projecting at right angles to the faces of the washer, but in opposite direction to the lug 7'. The lug 7' lies in substantially the same plane as the body of the washer, its outer end extending slightly beyond the face of the washer, the latter being beveled on the inner face as shown at 7ª in Fig. 3, and the same face of the washer at the other end thereof is beveled as at 8 in Fig. 3, and this said end, carrying the lug 9, is bent slightly out of plane with the body of the washer as clearly illustrated in Fig. 3 of the drawings. As will be seen, the thickness of the washer is increased only at the points where the lugs 7' and 9 are located, so that said lugs project slightly beyond what would form the normal thickness or planes of the opposing faces of the washer at this point. Hence, it will be understood that, under pressure, the washer, including the lugs, may be passed into practically the same plane as the body of the washer, there being only a sufficient projection of the lugs to retain a co-acting relationship with the abrupt walls of the notches to prevent unlocking the nuts. The front faces of the lugs are of substantial width so as to provide a surface which will not be readily bent or become worn, and which will afford sufficient support to prevent being snapped off under pressure.

In assembling the parts, the nut 5 is first screwed tight and then the washer is placed in position with the lug 7' located in the notch 6. The nut 10 is then run up on the reduced screw-threaded end until contact is made with the front extended face of the lug 9. Further movement of the nut is then had against the spring action of the washer, the lug 9 riding on the face of the nut 10 during such movement, excepting when a notch is reached when it passes into the notch and is again carried out over the beveled wall 12 thereof. This movement is continued until the desired spring tension is obtained, whereupon the lug is allowed to remain in the notch, or if additional tension is desired, the lug may be allowed to rest on the face of the nut. While such latter position does not prevent a movement of the nut 10 to unscrew the nut, such movement is limited by the presence of the succeeding notch 11 located in the relative path of movement of the lug 9, the passage of the lug within the notch effectually preventing a further unscrewing movement by reason of the lug passing into contact with the abrupt face of the notch. To remove the nut entirely it is required to employ some tool which will release the lug 9 from the notch.

What I claim and desire to secure by Letters Patent, is:—

The combination with a bolt having a screw threaded portion of two different diameters, the threads upon that portion of smaller diameter extending in an opposite direction with respect to the threads of that portion of larger diameter, of a main nut mounted upon that portion of larger diameter and having its outer face formed with a radially extending notch, a follower nut mounted upon that portion of smaller diameter and overlapping the portion of larger diameter, said follower nut having its inner face formed with a pair of notches, and a split washer having its terminals provided with rectangular lugs extending in an opposite direction with respect to each other, one of said lugs adapted to engage in the notch of the main nut and the other of said lugs adapted to engage in one of the notches of the follower nut, each of the terminals of said washer being reduced whereby the reduced portions of said washer will normally contact with the faces of the nut.

In testimony whereof I affix my signature in the presence of two witnesses.

RALPH H. FISHER.

Witnesses:
  MAX H. SROLOVITZ,
  A. J. TRIGG.